United States Patent [19]

De Souza Dias et al.

[11] 4,399,846

[45] Aug. 23, 1983

[54] MECHANISM FOR GRANULOMETRIC DISTRIBUTION OF SOLID PARTICLES

[75] Inventors: Edson De Souza Dias; Luiz D. D. Santos; João C. Teixeira; Osvaldo Amorin; Antonio R. D. A. Lamprecht, all of São Mateus do Sul, Brazil

[73] Assignee: Petroleo Brasileiro S.A. - Petrobras, Rio de Janeiro, Brazil

[21] Appl. No.: 255,815

[22] Filed: Apr. 20, 1981

[30] Foreign Application Priority Data

Apr. 18, 1980 [BR] Brazil .................................. 8002400

[51] Int. Cl.³ .............................................. B65B 1/04
[52] U.S. Cl. .................................... 141/192; 141/284; 141/331; 141/392; 193/29; 222/64; 239/651
[58] Field of Search ................ 141/198, 392, 250–284, 141/387, 388, 389, 331–345, 234–248, 286, 34, 94, 95, 96, 192; 193/29, 14, 34; 239/651; 222/64–69

[56] References Cited

U.S. PATENT DOCUMENTS 4,029,220   6/1977   Greaves ................................ 193/29

FOREIGN PATENT DOCUMENTS 803312   1/1969   Canada ................................. 193/29

Primary Examiner—Houston S. Bell, Jr.
Attorney, Agent, or Firm—Charles A. Blank

[57] ABSTRACT

A mechanism for the granulometric distribution of solid particles being loaded into a vessel of relatively large dimensions, such as a process reactor, blast furnace, silo, incinerator, dryer, etc., from equipment of small dimensions in relation to the vessel, includes a feed hopper which has an outlet opening that can be variably positioned within the mechanism to introduce the solid particles into a chamber located above the uppermost ends of a plurality of concentric, inclined, preferably conical or pyramidal surfaces. The latter define respective generally downwardly directed free flow paths for the particles to conduct them to a lower location where they enter the upper ends of a corresponding plurality of concentric sets of descending tubes. The discharge ends of the tubes where they feed into the vessel being charged are disposed in a symmetric array. The entire arrangement is such that, during the loading operation, the particles form a continuous bed of solids from the location where they accumulate in the space above the inclined plates to the location where they leave the descending tubes and accumulate in the vessel, so that the formation of "valleys" in the surface of the bed in the vessel and consequent segregation of the particles in the bed are effectively minimized.

11 Claims, 14 Drawing Figures

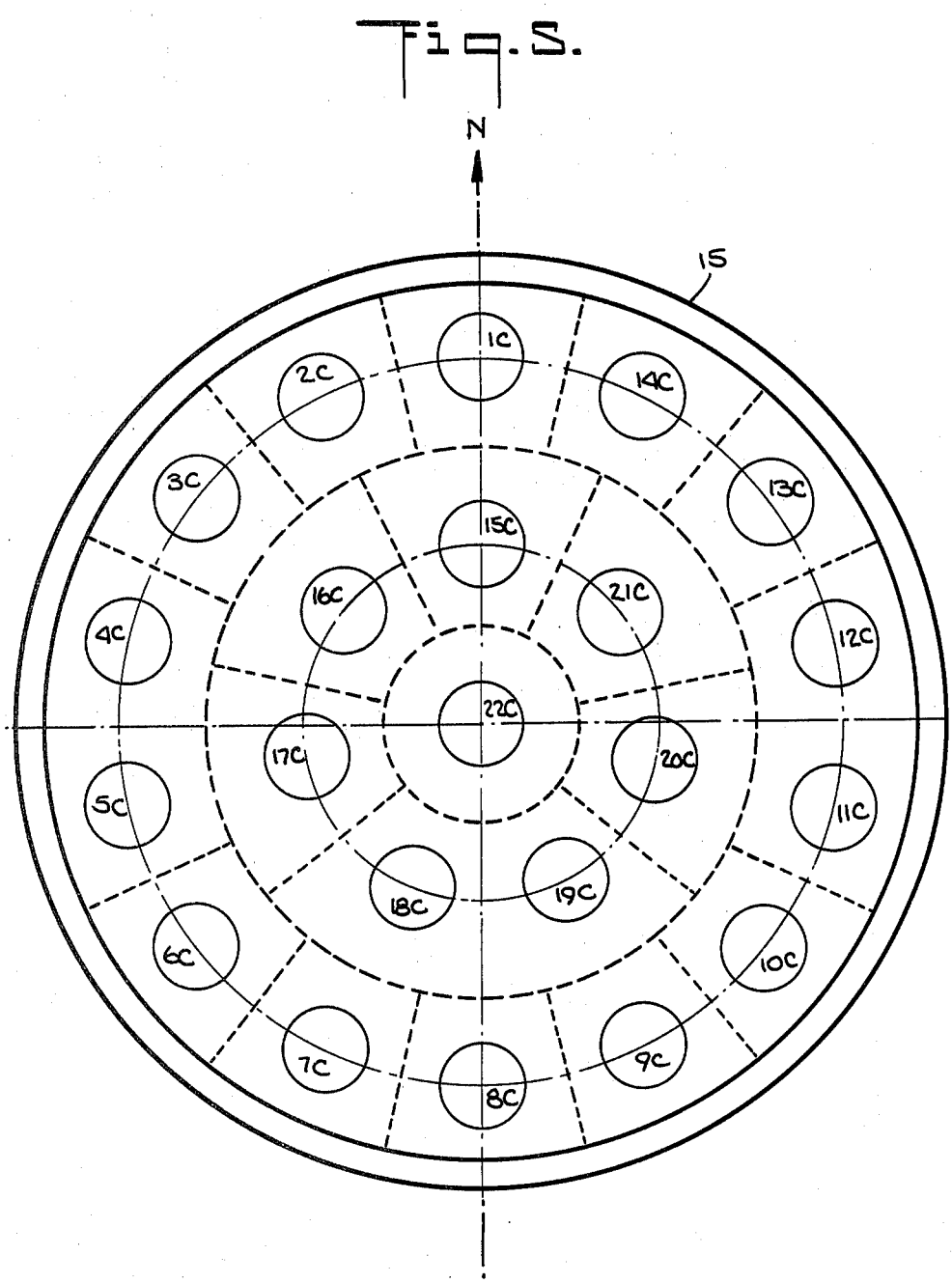

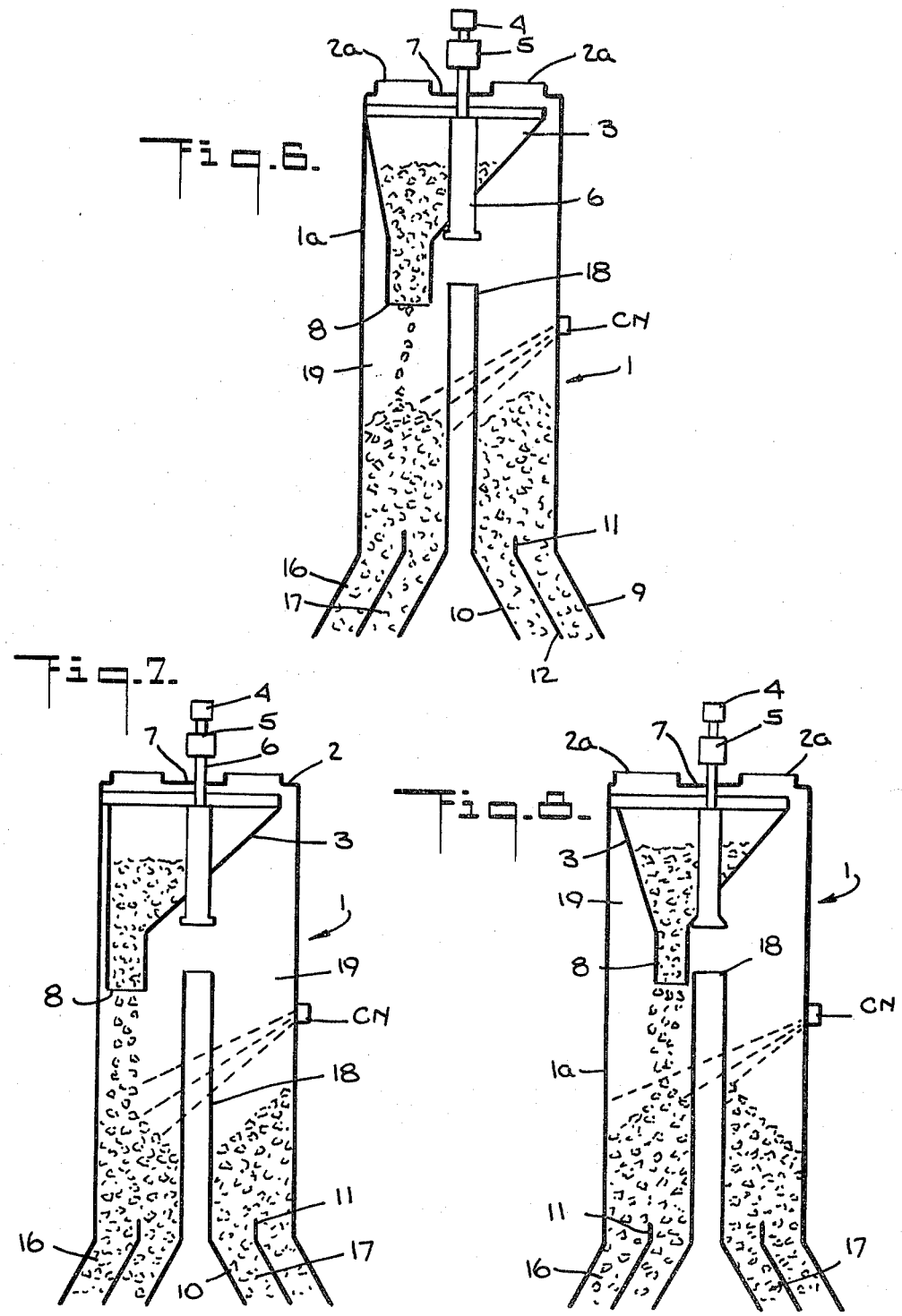

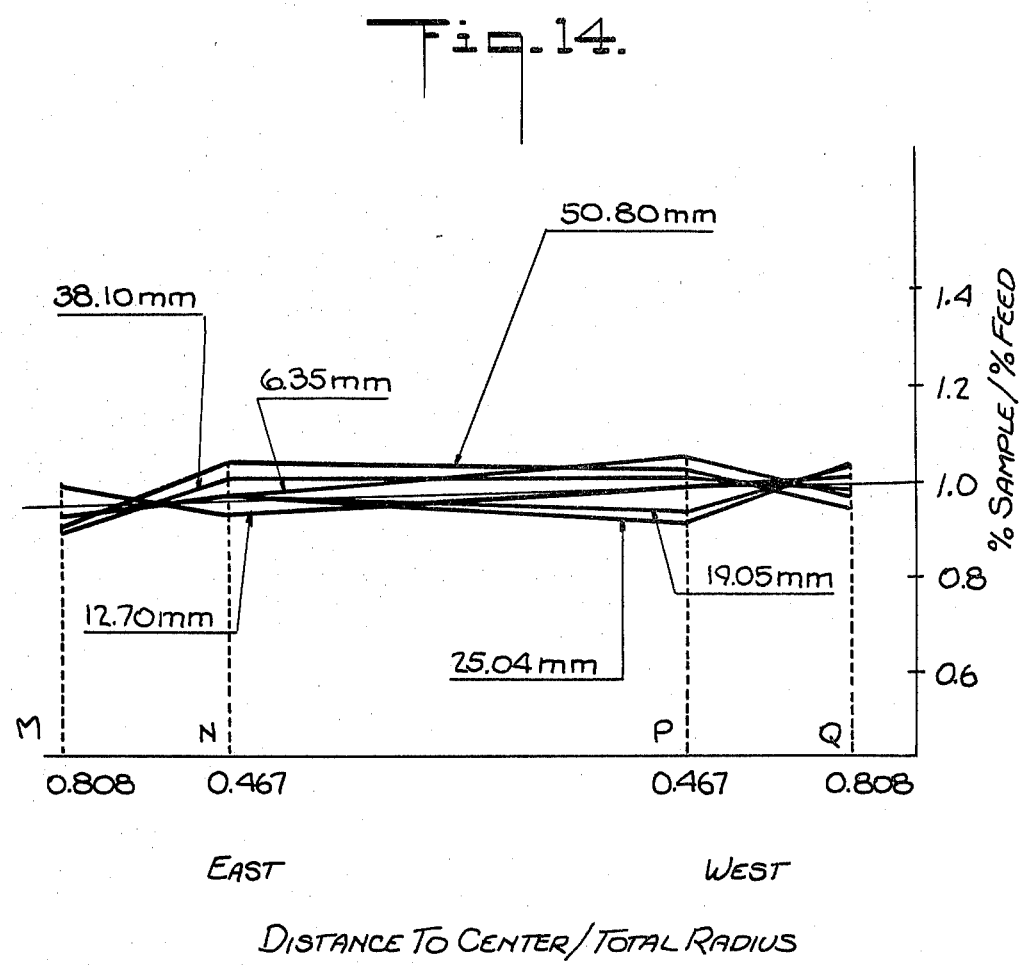

MECHANISM FOR GRANULOMETRIC DISTRIBUTION OF SOLID PARTICLES

This invention relates to a mechanism for charging large vessels, such as process reactors, dryers, incinerators, blast-furnaces, silos, etc., with solid particles from equipment of small dimensions in comparison with said large vessels. More particularly, the present invention relates to such mechanism which will effect the charging operation in either a continuous or an intermittent way, but in any event substantially uniformly in order to avoid segregation of the particles which can occur due to heterogeneity of the dimensions of said particles. The invention further relates to such mechanism which, when necessary, as in the case of blast-furnaces, enables the particles to be directed to previously determined regions of the vessel being charged. In general, the present invention renders it possible to obtain a dependable control over the granulometric distribution of the particles during the charging operation.

At the present state of the art, it is well known that, in processes which involve the granulometry of solid particles, said particles are not simply allowed to fall down at random to the interior of the vessel into which they are being charged. It is necessary to provide means to give them a certain orientation to avoid irregularities on the surface of the bed of solids. Heretofore, those skilled in the art have been particularly interested in keeping the surface of the bed flat. However, when heat transfer or contact between solids and gases are involved, granulometry has proved to be a very important factor to be observed due to irregularities which could occur in the process if the particles were not properly arranged in the bed. Thus, the basic purpose of the present invention is to provide a mechanism enabling a well-controlled distribution of the particles according to their granulometry to be achieved, though it is also a purpose of the invention to provide a mechanism capable of working as a loading equipment.

The invention herein disclosed is the result of improvements introduced in the equipment as described in Brazilian patent application No. PI-7805842 (owned by the assignee of the present invention) in order to avoid some difficulties that have been encountered when the principles of the equipment of the referred application were employed in large volume receptacles.

The basic principle of the invention described in Brazilian application No. PI-7805842 is to permit the solid particles to flow downward, from a rotating hopper over a conical or pyramidal surface whereon said particles slip to a plate provided with a row of holes and thence into the upper regions of a number of descending tubes that are in communicaton with said holes, thus forming the path for the descending particles to the interior of the vessel in a uniform arrangement. For better understanding, an example of a geometric model of an embodiment of said invention is given.

Thus, in the equipment of Brazilian application No. PI-7805842, an inclined plane on which the solid particles slip is represented by a cone. The plate provided with holes, to which the descending tubes are attached, would be represented as a narrow brim fixed around the base of said cone. The assembly of said cone and the narrow brim at its base is enclosed and protected by a plate formed in the shape of a frustum of a cone, the lower rim of said frustum being welded to the outside circumference of the rim. Thus, it is easy to understand that the solids falling on the conical surface will be invariably guided to the bottom plate whence they will flow through the holes to the descending tubes.

According to the same line of thought (analogy with a geometric model), it can be seen that the present invention shows several new aspects in respect to that disclosed in the aforesaid Brazilian application No. PI-7805842.

(a) Instead of the solids (which come from a rotatory hopper) falling over the external surface of a single cone or pyramid, they are divided into two parts, each part flowing on a respective one of two conical or pyramidal concentric surfaces.

(b) Instead of a single line of holes on the bottom plate which envelops the lower rim of the conical surface (as shown in Brazilian application No. PI-7805842), the present invention includes two lines of holes each at the bottom of a respective conical surface which permits a greater number of descending tubes in the same surface area because two ring plates are provided at the base of the two conical surfaces.

(c) Since there are more descending tubes in the equipment of the present invention than in that disclosed in Brazilian application No. PI-7805842, for the same available space, it is possible to obtain a distribution of the lower ends of the tubes according to a more compact model than in the prior equipment.

It is well known by those skilled in the art that the minimum diameter of a tube in a multitubular arrangement of a loading equipment is a function of the granulometry of the particles that are being loaded. This happens because, if the cross-section available for the solids to flow into is small in respect to the diameter of the particles, there will be problems due to the building up of static agglomerates known as "bridges" or "cages," which, in common parlance, is called "clogging." In the current practice, said tube diameter cannot be smaller than three times the particle diameter. On the other hand, if the cross-section of the tube available for the flowing of the solids is extremely large in respect to the diameter of the particles, segregation is liable to occur inside of the tube and, accordingly, in the loading points.

It is evident that knowledge of these facts is the result of scientific research on problems regarding the flow of solids. Some factors, like the case of the diameter of the particles being larger than that of the tubes or the case of free fall of the particles without any interaction among them, are not considered.

Another factor that must be observed when conveying solid particles by means of multitubular loaders is the interval among the tubes on the loading site, i.e. the distribution of the lower extremities of the tubes which end in the interior of the vessel to which the solids are being conveyed. If the lower extremity of each tube is quite far apart from that of the next tube, the bed of solids immediately under the extremities of said tubes will not present an even arrangement. The space comprised among several open extremities immediately under the plane formed by the said lower tube extremities to a certain distance downwardly in a vertical direction (said distance being a function of the distance from one extremity to the next one), will remain empty due to a phenomenon well known by those skilled in the art as the formation of "valleys." More specifically, such "valleys" are voids in the bed which are formed because of a tendency of the granulated solids to accumulate in conic piles. When said solid particles flow continuously, there is a tendency for these cones not to be formed due to the conjoining of them at their bases; instead, there is a tendency of the bed to become compact. However, such ideal arrangement of the solid particles in vertical flow is never obtained (expecially if the flow is continuous) because the lower extremities of the loading tubes are always somewhat spaced apart from each other. Thus, the formation of "cones," even if highly minimized, is almost impossible to avoid and "valleys" will always be present.

From what was said above, it is clearly understood that the more distant the lower extremity of one tube (through which the particles flow to the interior of the vessel) is positioned in relation to that of the next tube, the larger is the width of the associated "valley". As each "valley" is formed by the side surface of the "cones" formed by the solids, it is easily understood that, when a "valley" has a very large width, it corresponds to "cones" of great dimensions and that will provide conditions for the particles to slide freely on such cone surfaces, thus causing an unavoidable segregation of the large particles from the small diameter particles (fines). It is one of the objectives of the present invention, if not to eliminate the formation of "valleys," at least to minimize the appearing of said "valleys" in such a manner that, with the "cones" having only a small slope and a little "height," the sliding of the solids and consequent segregation are not so likely. Thus, the solids bed, from the top of the mechanism to the bottom of the large vessel where the solids are being accumulated, functions as an agglomerate which flows with a uniform flow through its entire height.

As it was decribed above, according to the scheme of the invention disclosed in Brazilian application No. PI-7805842, the middle part of the loading mechanism includes a limited area which envelops the base of a cone or a pyramid, being on said limited area attached to a series of descending tubes which lead the flow of solids to an area defined by the cross-section of the body of the vessel following a very compact pattern of distribution of the lowest extremeties of said tubes. In other words, as it has been seen that the solid particles, before reaching the interior of the vessel, are forced to flow on an inclined surface, the upper apertures of the loading tubes were adapted to holes at the bottom of said inclined surface. The downwad direction of each of said tubes is conveniently deviated in each case to provide a compact arrangement of the lower ends of the tubes in the interior of the vessel.

Depending on the size of the particles which will define the diameter of the loading tubes for a certain cross-section of the vessel to the interior of which solid particles are being loaded, the scheme of the prior equipment has proved to be completely efficient. However, when it is necessary to design a vessel to work with great quantities of solids (the specifications for the size of the solids and consequently the diametere of the tubes being kept unchanged), the number of tubes required may be so large that even only one line of holes disposed in an arrangement around the base of the cone or pyramid, would require exceedingly large dimensions for said cone or pyramid to include all the tubes. The problem may become so serious that, for a given cross-section of the vessel, if a great number of descending tubes is necessary (for the technical principles of Brazilian application No. PI-7805842 to be followed), the dimensions of said cone or pyramid would be disproportionately large in comparison with the dimensions of said vessel and the descending tubes would be exceedingly long in order to compensate for the inclination necessary to position the lower extremeties of said tubes in the loading area. On the other hand, many problems would arise in regard to the stability of the assembly, unnecessary material would be spent to make the equipment and, principally, the basic scope of the invention would not be fulfilled, because, instead of a large vessel being charged by means of a small equipment, the loading equipment would be larger than the vessel.

Another obstacle that must be overcome is the unnecessary length of the tubes, because an increase in the time of flow of solids inside the tubes (especially if they are inclined) would provide conditions for segregation instead of avoiding it.

Another difficulty that may arise with the disproportional increase in the size of the cone or pyramid on whose surface the solids have to slide, is the increase in the time of residence of the solids during all stages of the process, which would mean a loss in efficiency of the antisegregational effect.

Thus, for certain conditions of granulometry of the particles and size of the vessel, the invention disclosed in Brazilian application No. PI-7805842 would be satisfactory, but in cases like those just described above (say, great dimensions of the equipment) changes in the scheme of the invention become necessary in order to avoid the above-mentioned problems. This is the basis on which the mechanism of the present invention was conceived. dr The foregoing and other objects, characteristics and advantages of the present invention will be more clearly understood from the following detailed description thereof when read in conjunction with the accompanying drawings, in which:

FIGS. 2, 3, 4 and 5 are cross-sectional views, on greatly enlarged scales, taken along the lines O-O, A-A, B-B and C-C, respectively, in FIG. 1;

FIGS. 6, 7 and 8 are fragmentary diagrammatic illustrations, in vertical section, of the upper part of the mechanism of FIG. 1 and show certain variants thereof according to the present invention;

FIGS. 11 to 14 are graphs of data taken from actual granulometric analyses and workings of the mechanism of the present invention.

Figure 1:
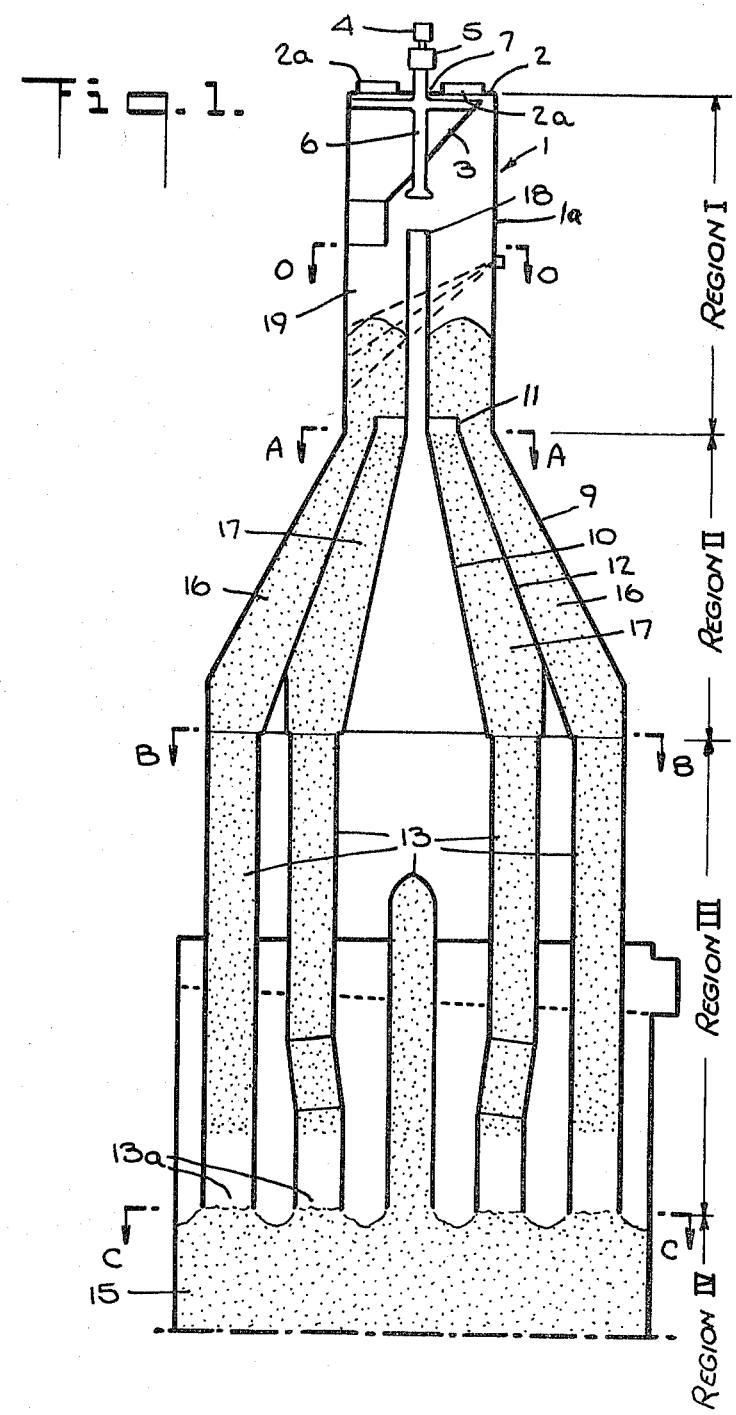
FIG. 1 is a diagrammatic illustration of the mechanism according to the present invention, in vertical section.

Referring now to the drawings, and especially to FIGS. 1 to 8, in greater detail, it is seen from FIG. 1 that the mechanism of the present invention has, over its vertical extent, four distinct regions denoted I, II, III and IV.

Region I comprises a hollow cylinder 1 provided with a lid 2, said lid being provided with a plurality of charging holes or openings 2a through which solid particles are introduced from outside by means of any suitable device.

A funnel shaped hopper 3, which in its lower extremity is provided with a discharge opening or hole 8 through which said solid particles flow downwardly, is positioned under the loading holes 2a. This funnel shaped hopper 3 is attached to a shaft 6 supported in a bearing 7 and impelled to a slow circular motion by means of a motor 4 connected to said shaft 6 by means of a reduction gear 5.

Region II presents, as an outstanding feature, a space for the solids to flow freely, such space being defined by conical surfaces which direct said solids to region III. More specifically, there are three conical surfaces: one is an inner surface that is formed by the cone 10; the second one is an intermediate surface 12 that is constituted by a metallic plate formed in the shape of a frustum open at its top and making an envelope to the central cone 10; and the third one is the inner surface of the external wall 9 surrounding the entire region II of the equipment. Said conical surfaces thus form two compartments for the solid particles to flow through: the compartment 16 between the inside face of the external wall 9 and the outside face of the intermediate conical surface 12, and the compartment 17 between the inside face of the conical surface 12 and the outside face of the cone 10.

The top of the cone 10 extends upward into the region I by means of a small diameter cylinder 18 that is situated precisely under the lower extremity of the shaft 6. The cylinder 18 terminates substantially at or slightly above the level of the opening 8 in the bottom of the rotary funnel shaped hopper 3, thus providing the compartment 19 defined in the cylinder 1 with the shape of an annular ring in cross-section (see also FIG. 2) in which the free surface of the bed of solids is formed.

As shown in FIG. 1 (in a lengthwise cross-section), the conical plate 12 at its top opens upwardly by means of a rim 11. From FIG. 2 (which shows the cross-section O-O) and FIG. 3 (which shows the cross-section A-A) it is seen, therefore, that by means of its relative position the rim 11 acts as a flow divider.

Figure 2:
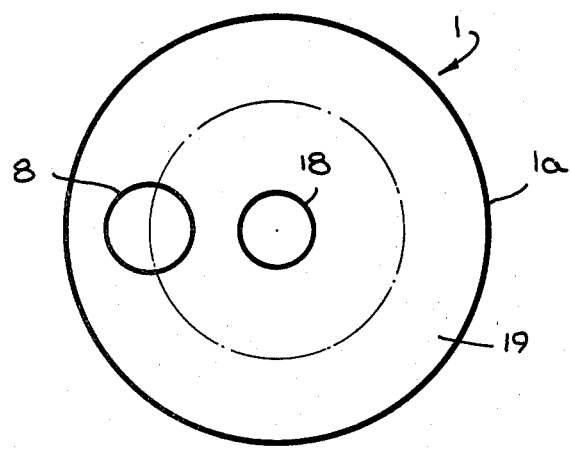
Figure 3:
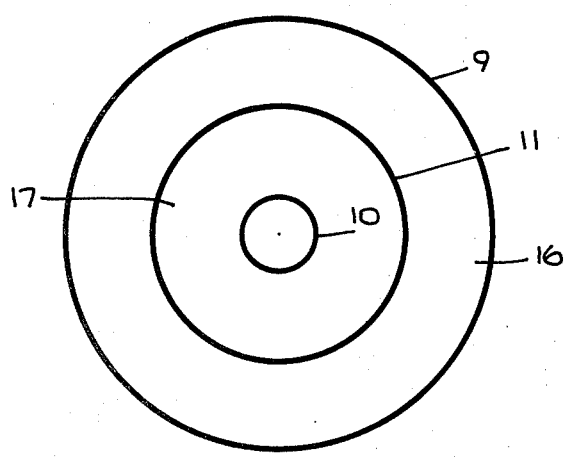

In FIG. 2 the relative position of the loer opening 8 of the rotating hopper 3 in relation to said rim 11 can be seen, as also the relative position of the cylinder 18 that is an extension of the cone 10. According to FIG. 2, the free surface of the solids accumulated in the compartment 19, after having entered the compartment when the discharge opening 8 of the hopper 3 is centered (as indicated by the dot-dash circle in FIG. 2) in the annular space surrounding the inner cone cylinder extension 18, will have an angle of rest whose vertex will coincide, i.e. be in substantial vertical alignment, with the rim 11, as can best be seen in FIG. 6. Thus the solids slide uniformly on each of the inclined surfaces, thereby causing an homogeneous granulometric distribution in each of the two compartments 16 and 17.

There are two other possible ways of positioning the discharge opening or hole 8 of the funnelled hopper 3 in respect to the rim 11 of the open conical plate 12:

(a) On the one hand, as shown in FIG. 7, the opening 8 may be closer to the internal face of the wall 1a of the cylinder 1 in the region I in such a way that, as the mass of solid particles accumulates in the compartment 19, its free surface has a funnel-like shape according to which arrangement the uppermost portion of said surface is closely adjacent to the cylinder wall and the lowermost portion, i.e. the bottom of the funnel-like surface, is closely adjacent to the central cylinder 18.

(b) On the other hand, as shown in FIG. 8, the opening 8 may be positioned closer to the periphery of the extension cyclinder 18, which causes the solid particles to accumulate so as to form a conical pile the top of which is situated closely adjacent to the cylinder 18 and the lower limit of which is closely adjacent to the external wall 1a.

In case (a), the solid particles which fall from the opening 8 of the rotating hopper 3 slide over the inclined surface of the bed in the compartment 19 in such way that the large particles tend to accumulate close to the cylinder 18 and the small particles gather close to the internal face of the wall 1a which envelops the region I. As the bed of solids flows downward to the interior of the mechanism, therefore, coarser particles concentrate in the compartment 17 from where they pass through the inner ones of the descending tubes 13 within the region III to the central zone of the vessel 15 defined in the region IV. The smaller particles tend to flow to the compartment 16 and then, after passing through the outer ones of the descending tubes 13, accumulate in the peripheral zone of the vessel 15.

In case (b), the result is exactly the contrary of what happens in case (a). Thus, the coarser particles, which again gravitate to the lower region of the conical mass of particles, now adjacent the wall 1a, flow to the compartment 16 and then, from there, to the peripheral zone of the vessel 15, while the fine particles enter the compartment 17 and flow from there to the central zone of the vessel 15.

In both cases (a) and (b), an oriented segregation is achieved. If, instead, the center of the opening 8 of the funnel shaped hopper 3 is aligned with the top of the circular rim 11 of the upwardly open conical plate 12, then the loading of the vessel is effected without segregation, i.e. in all internal zones of the vessel 15 located in region IV, the same granulometry is achieved as existed in the material prior to loading, this being obtained because of the unique characteristics of design of the mechanism described in the present invention.

Figure 4:
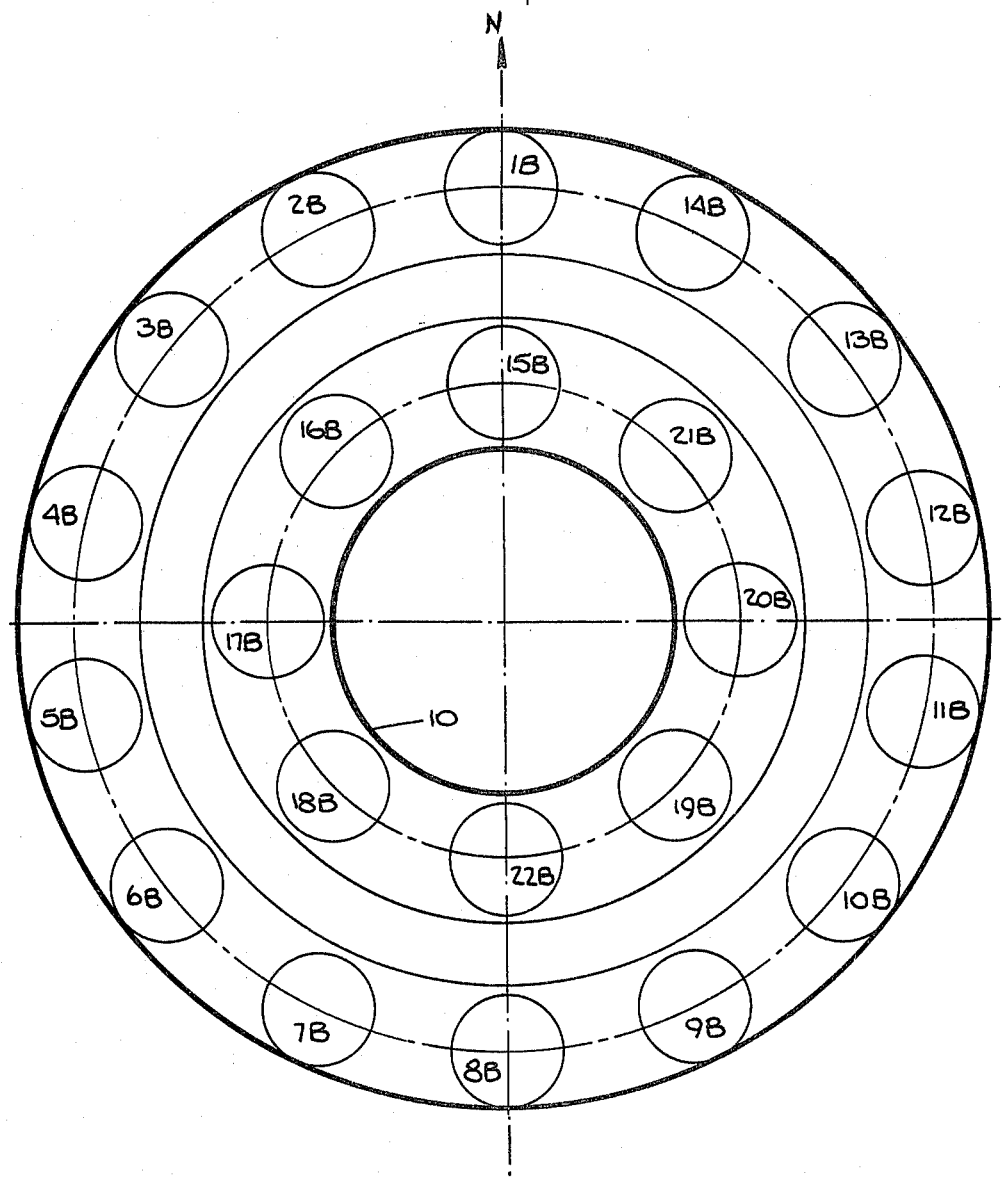

As can be seen from FIG. 1, the presence of the two concentric conical regions 16 and 17 is the characteristic which enables one, as shown in cross-setion in FIGS. 4 and 5, to include in the same circular area a larger number of descending tubes 13 of a given diameter, specifically because said tubes 13 are arranged in two concentric circular rings. This advantage, which is peculiar to the present invention, enables the formation of "valleys" to be minimized through the more compact distribution of the outlet openings 13a (FIG. 1) at the lower extremities of the tubes 13 in the interior of the vessel 15 (region IV) that can be achieved, and, consequently, also leads to a reduction of the additional segregation problems at this step of the loading.

It is important to note that the number of descending tubes 13 which is disclosed herein for use in the mechanism of the present invention (as shown in FIGS. 1, 4 and 5) is limited to 22, but it should be realized that this number has been given just to simplify the understanding of the invention and that the number may be, for any given case, the largest that can be included in a given area. In the present application it was deemed advisable not to present a very large number of tubes 13 in the drawings, in order not to render them very complex without contributing to the understanding of the scope of the invention.

The descending tubes 13 in the region III undergo changes in direction when passing from the scheme of FIG. 4, where they are identified as tubes 1B to 22B, to that of FIG. 5, where they are identified as 1C to 22C. This is clearly seen, because from the level of the lower end of the concentric conical compartments 16 and 17, in which said tubes 13 are distributed in two concentric circular rings (see FIG. 4), the tubes 13 change to a more homogeneous distribution (see FIG. 5) at the level of discharge into the interior of the vessel 15 (region IV). This rearrangement is accomplished because some inclination is applied to some tubes, as clearly shown in FIG. 1.

Insofar as the general operation of the mechanism of the present invention is concerned, it is to be noted that an automatic level control CN (see FIG. 1) is provided which operates according to sensors equipped with photoelectric cells, gamma rays or any sensible radiation therein provided which senses the loading of the chamber 19, stopping the admission of feed from the outside in order to avoid blocking the rotary movement of the funnel shaped hopper 3 whenever the level of solids in the region I reaches a critical maximum value.

It is deemed advisable to add that the examples given herein of cylindrical and conical surfaces have been presented only in order to make the conception of the present invention easily understood, but they are by no means limiting factors of this invention. The same principles as those described herein, can be applied to pyramidal and prismatic surfaces whose cross-sections may be triangles, squares, hexagons, etc. The only important aspects that have to be maintained in all cases are the rotational system of loading, the inclination of the surfaces on which the solid particles slip, the presence of two concentric inclined surfaces, the relative positioning of the funnel-shaped hopper, the downward distribution of the loading tubes, and the level control.

To provide a practical demonstration of efficiency of the mechanism therein described in the loading of fragmented solids, there are presented in the following description some average values taken from granulometric analysis of samples of material obtained from vertical vessels loaded with the hereinbefore referred to equipment in continuous operation. Of the two tables set forth below, Table I presents data from a vessel loaded without the employment of the mechanism described in this invention, solid particles being dropped at random due to the action of gravity forces. Table II, on the other hand, presents data obtained from the same vessel, but this time it was loaded by means of the mechanism herein described fitted to promote a granulometric distribution without segregation of the size of particles in the bed.

Figure 9:
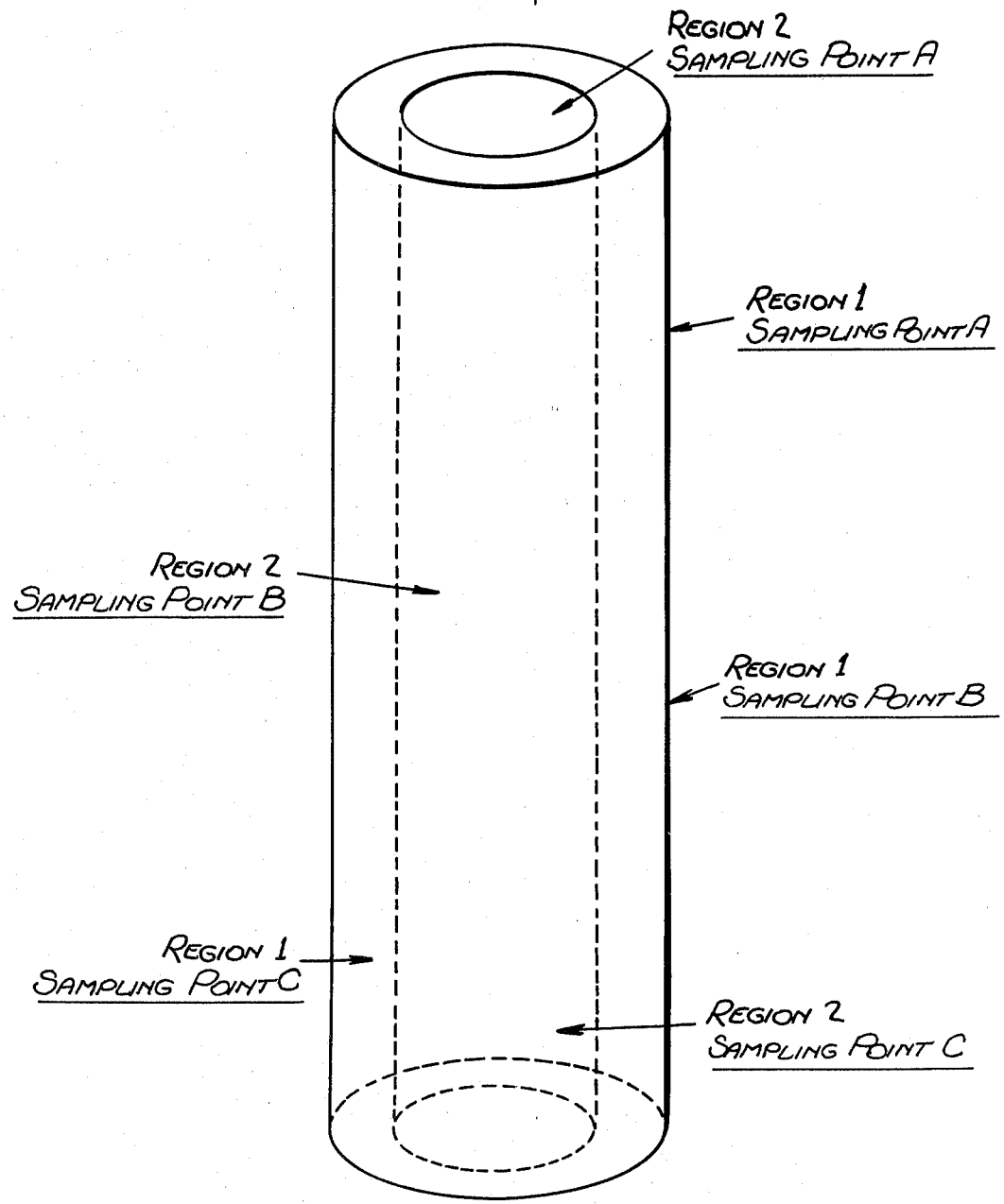
FIGS. 9 and 10 are schematic representations of regions of the mechanism of the present invention to aid in the discussion of the functioning of the mechanism.

The regions of the vessel from which samples are taken are schematically outlined as two concentric cylinders in FIG. 9 (the outer cylinder is denoted Region 1 and the inner one Region 2, in each case over its entire length) just to give an idea of the positioning of the points of sampling when said samples are taken radially or in depth. It is important to bear in mind, however, that the sampling points denoted A, B and C in the sketch for each region are not intended to be exactly located; rather they are shown only to make clear that the samples are taken from different levels. Furthermore, each point does not represent a specific "sample"; it is rather the average of several samples taken from a level approximately indicated by the arrow. Accordingly, the numbers set forth in the tables are averages of many values obtained in several levels in the same region.

Region 1, as sketched in FIG. 9, includes the peripheral zone of the bed which represents 63.6% of the total volume of solid particles loaded.

Numbers in the tables are the percentages in weight of each size of particle found in the granulometric analysis of the solids sampled in the various levels of the two concentric regions of the vessel. More precisely, each number represents the average of several values for each level in the same region.

The ranges for the size of particles are limited by preestablished values, so that granulometric ranges of particle diameters between 5.08 cm and 2.54 cm, between 2.54 and 1.90 cm, and under 1.90 cm are covered.

TABLE I

| | % of Solid Particles | | | |
|---|---|---|---|---|
| | from 5.08 to 2.54cm (coarse) | from 2.54 to 1.90cm (medium) | under 1.90cm (fine) | weight of sample kg |
| Feed | 56.27 | 13.07 | 30.66 | 1320 |
| Region 1 | 61.28 | 13.08 | 25.64 | 840 |
| Region 2 | 47.03 | 13.11 | 38.96 | 420 |

TABLE II

| | % of Solid Particles | | | |
|---|---|---|---|---|
| | from 5.08 to 2.54cm (coarse) | from 2.54 to 1.90cm (medium) | under 1.90cm (fine) | weight of sample kg |
| Feed | 32.37 | 15.68 | 51.95 | 1100 |
| Region 1 | 32.50 | 15.68 | 52.22 | 700 |
| Region 2 | 32.28 | 15.90 | 51.82 | 400 |

From an examination of Table I it can be seen that, without the use of the mechanism of the present invention, a significant segregation occurs in the two concentric regions. The peripheral region (Region 1) presents a high concentration of particles with diameter larger than 2.54 cm when compared with the central region (Region 2). On the other hand, particles with diameter smaller than 1.90 cm are concentrated in the central region (Region 2).

From an examination of Table II, on the other hand, it is seen that when using the equipment of the present invention with the funnel-shaped hopper 3 positioned in such a manner that the center of its bottom opening 8 coincides with the line formed by the rim 11 on top of the conically shaped plate 12, a loading without segregation is achieved, since the granulometric analysis of the particulate solids after the loading (in the two concentric regions) presents almost no alteration in respect to the granulometric analysis of the original feed.

Figure 10:
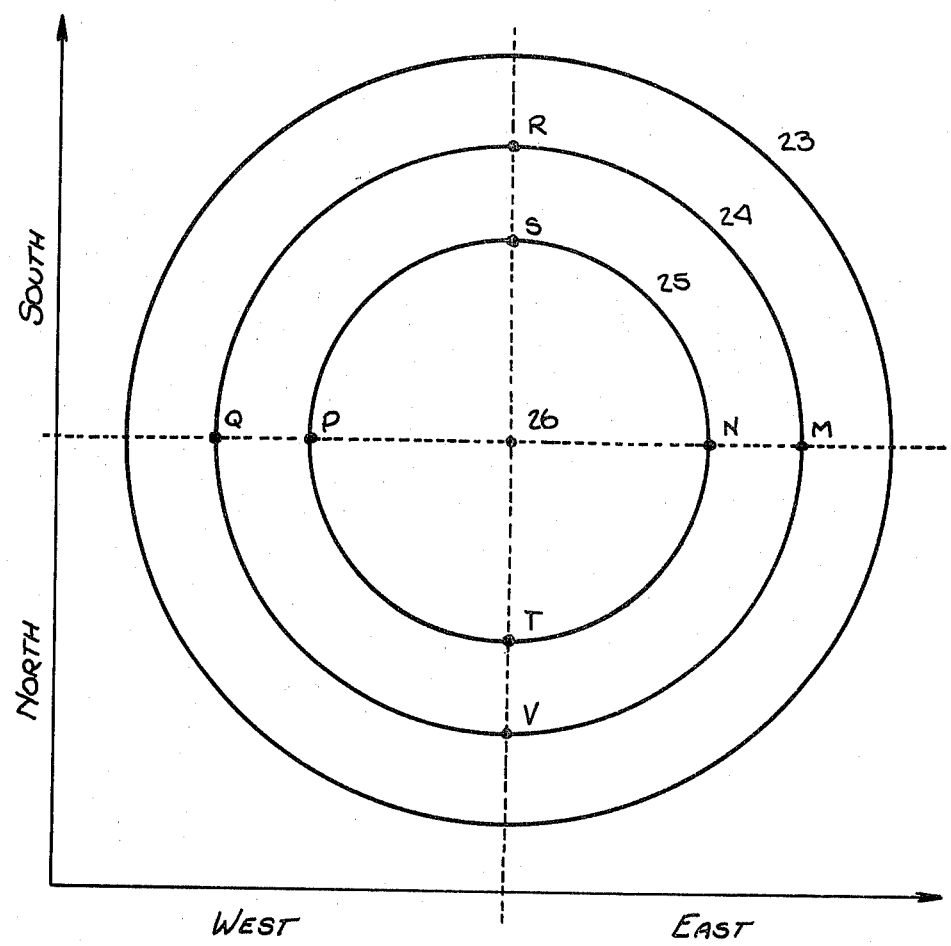

FIG. 10 shows a sketch of a cross-section of the vessel 15 where the numerals 24 and 25 represent circumferences of specific regions within the outer boundary, denoted 23, of the vessel, the relative positions of these various regions to the center of the vessel, here denoted 26, defining the zones from which the samples were taken.

Data from granulometric analysis of said samples, after some mathematical treatment that will be more fully described presently, are plotted on graphs as shown in FIGS. 11, 12, 13 and 14 which give a clear view of the loading of a bed free from segregation.

Reference is now made to FIG. 10 in greater detail. Taking the distance from the central point 26 to the outer wall 23 of the vessel as the basis for reference, the distances from the circumferences 24 and 25 to the center 26 will be referred to in terms of the relation between the said distances and the distance from the center 26 to the outer wall 23 of the vessel. Evidently, therefore, in any case, the respective relations will always be less than 1.00, which defines the precise point of sampling.

Circumference 24 represents a sampling region at a certain distance from the center 26 in such a manner that the quotient obtained by dividing said distance by the total radius is 0.808, which defines the sampling points Q, R, M and V.

Circumference 25 represents a sampling region where the quotient obtained by dividing the distance from the circumference 25 to the center 26 by the total radius of the vessel, is equal to 0.467. The said circumference 25 defines the sampling points N, P, S and T.

Only to keep a certain discipline in the systematics used and to provide that the data are typical of well localized sampling points, a series of samplings were made in the north-south direction, which corresponds to the points R, S, T and V on said circumferences 24 and 25, the pair of points R and S on the one hand and the pair of points T and V on the other being located, respectively, in the north and in the south regions of the cross-section, approximately on the points determined by the intersections of the north-south diameter (vertical in FIG. 10) with said circumferences. Another group of samples was taken from locations on the east-west diameter, specifically the points M, N P and Q where said diameter (horizontal in FIG. 10) crosses the circumferences 24 and 25 in the east and west regions of the cross-section.

This choice was taken to make sure that cross-section was scanned according to two well representative directions in the bed of solids. Data are the average of samplings performed at several levels and are referred to specific particle sizes taken from granulometric analyses.

The "gauges" which define the medium size of the particles are numbers referred to the greatest diameter of each granulometry range. This definition is given only as a conventional reference to make the results easier to understand.

Table III below gives the correspondence between "gauges" and granulometry ranges.

TABLE III

| | Granulometric Range Particle Diameter | |
|---|---|---|
| gauge | larger than (in mm) | smaller than (in mm) |
| 6.35 | — | 6.35 |
| 12.70 | 6.35 | 12.70 |
| 19.05 | 12.70 | 19.05 |
| 25.40 | 19.05 | 25.40 |
| 38.10 | 25.40 | 38.10 |
| 50.80 | 38.10 | 50.80 |

The experiments were conducted in the following sequence:
1. Granulometric analyses were performed with the solid particles of the feed before dropping them into the vessel, thus obtaining the percentage of solids included under each "gauge" of solids in the mixture.
2. The solid particles were then loaded into the vessel without using the anti-segregational mechanism of the present invention, and a new set of data were obtained from granulometric analysis.
3. Finally, the percentage of solids of each "gauge" obtained after loading was divided by the percentage of solids of the same "gauge" in the original feed before loading.

In the case that no segregation is found to have occurred during the loading operation, the relation obtained pursuant to item 3 above is a quotient equal to 1.00.

If segregation does occur, the quotient will be:
(a) greater than 1.00 when the percentage of solid particles of a given average size ("gauge") after the loading, is greater than the percentage of the particles of the same size in the original feed;
(b) less than 1.00 when the percentage of solid particles of a certain size after being loaded into the vessel, is smaller than the percentage of the same size of particle before loading.

It will be clearly understood that, when the quotient is greater than 1.00 with respect to the samples of a certain region of the bed, values smaller than 1.00 will be found for other regions. This is a consequence of the migration of particles in the bed and is further evidence that segregation occurred.

4. The vessel was charged employing the anti-segregational mechanism of the present invention and granulometric data from the solids, taken from the referred sampling points, were obtained.
5. The percentage of solid particles of each "gauge" was obtained by following the procedure described in item 3 above, i.e. dividing th post-loading percentage values obtained pursuant to item 4 by the pre-loading percentages obtained pursuant to item 1.

In this case too, quotients near or at 1.00 represent little or no segregation, while quotients greater or less than 1.00 show that segregation occurred.

Said data were plotted on graphs as shown in FIGS. 11, 12, 13 and 14. On said graphs the sampling points designated by the above-mentioned letters, are plotted on the abscissas at the quotients corresponding to the respective ratios of (a) the distance from the sampling point to the center point to (b) the total radius, and the quotients of the granulometric relations for each "gauge" of solid particles are plotted on the ordinates. Finally, the points in the graph corresponding to each particle size are united by straight lines, forming in each case an irregular line which represents the profile of the arrangement of the data for each particle size distribution. It will be apparent that the more obtuse the angles formed by the sections of any given irregular line, the more the profile of that line will be "flat" and close to the horizontal (which corresponds to the quotient 1.00).

Figure 11:
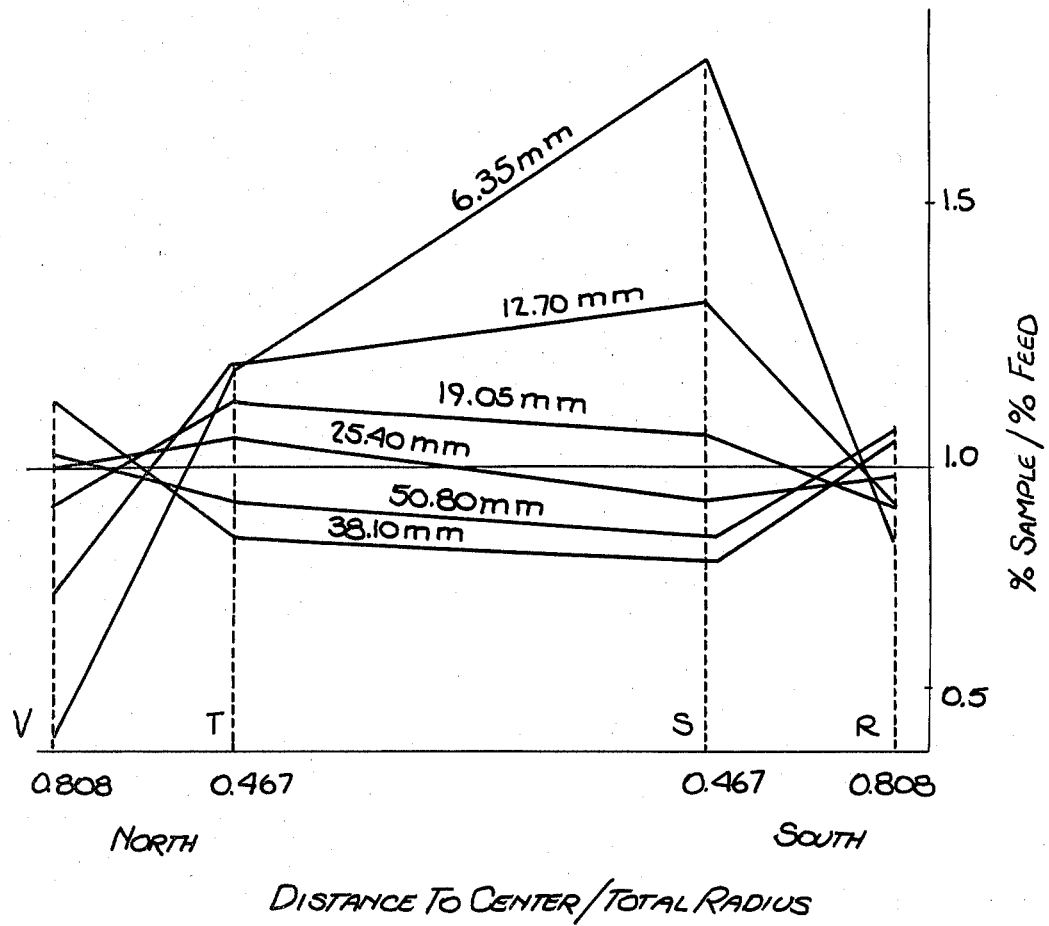
Figure 12:
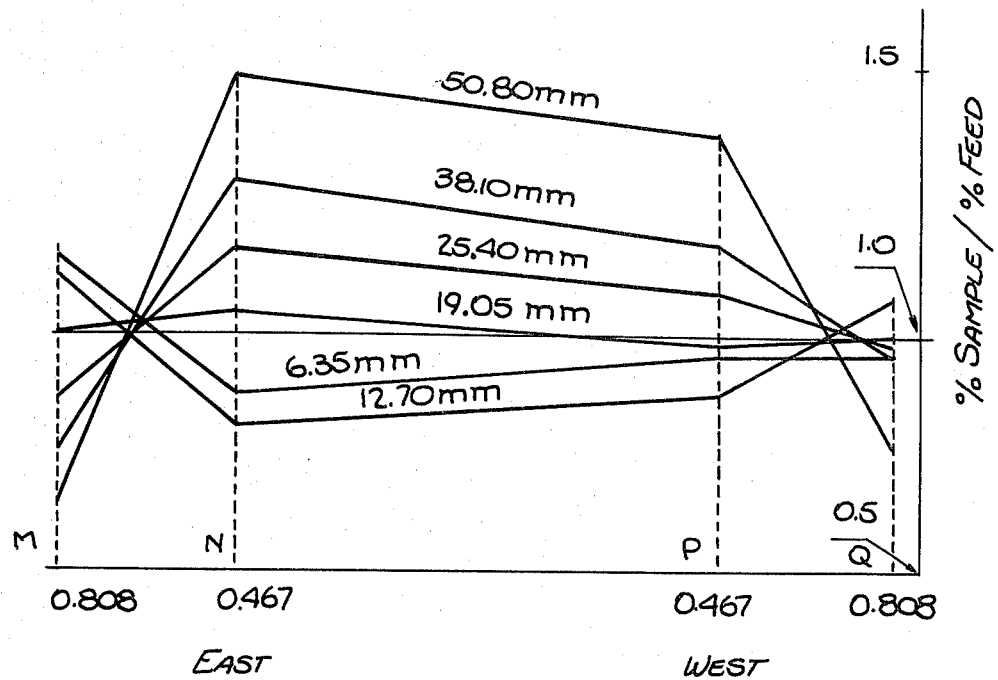
Figure 13:
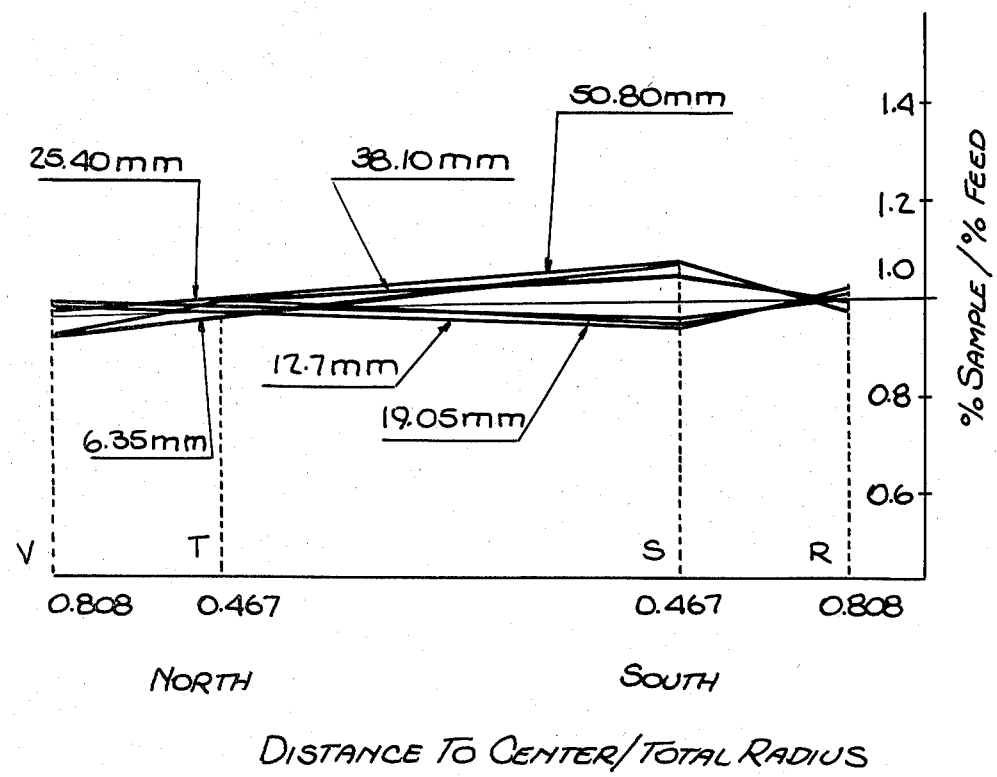

To sum up, the graph of FIG. 11 refers to a loading operation in which the mechanism of the present invention was not employed and the samples were taken on the north-south direction, while FIG. 12 is the graph of an operation similar to that represented by FIG. 11 but in which samples were taken on the east-west direction. In contrast thereto, FIG. 13 presents the graph which results from an operation in which the anti-segregation mechanism of the present invention was employed, the direction of the sampling procedure being north-south, and FIG. 14 is the graph prepared with data obtained when the anti-segregational mechanism of the present invention was employed but the direction of sampling was east-west. Thus it will be evident that when the present invention was utilized, almost no segregation occurred during the loading operation.

As previously stated, the present invention is applicable to use with a variety of different industrial processes. Merely by way of examle, the vessels into which the particles are being charged may be blast furnaces employed for the reduction of ores to metals by reaction with coke. Again, the solids being processed may be particles of bituminous shale, and the vessels into which they are charged may be pyrolysis vertical retorts in the interiors of which the shale particles flow downwardly forming a moving bed which is heated by contact in counter-current with upwardly flowing hot gases. Other examples of like or different operations will readily suggest themselves to those skilled in the art.

Generally speaking, therefore, the present invention can be seen to provide a mechanisn for granulometric distribution of solid particles which is specially designed to provide the loading of such solid particles into large dimension vessels starting from equipment of small dimensions in relation to said vessels, the mechanism being characterized by the presence of the following features:

means (3) which can be variably positioned to introduce disaggregated solid materials into the mechanism;

means, constituted of a plurality of inclined concentric surfaces (10, 12) positioned under an outlet opening (8) of the introducing means (3), for providing for a free flowing of the disaggregated solid materials along a plurality of paths from the region of their introduction into the mechanism to a lower location; and means for conducting the disaggregated solid materials away from the said lower location, this last-named means comprising a corresponding plurality of concentric closed lines of downwardly inclined tubes (13) under the region where the inclined surfaces are located, with each of the lines of tubes communicating with the respective one of the flow paths defined by the inclined surfaces, and the tubes being provided with a symmetric arrangement of their lower extremities in the region where the tubes open to the interior of the associated vessel (15);

the inclined surfaces and the descending tubes being constructed and arranged such that, during the loading operation, the disaggregated solid materials form a continuous bed from the location where they fall from the introducing means (3) to the location where they leave the descending tubes (13) and accumulate in the interior of the associated vessel (15).

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defind in the hereto appended claims.

What is claimed is:

1. Mechanism for granulometric distribution of solid particles specially designed to provide the loading of solid particles into large dimension vessels starting from equipment of small dimensions in relation to said vessels, characterized by being composed of:

means (3) which can be variably positioned to introduce disaggregated solid materials into said mechanism;

means, constituted of a plurality of inclined concentric surfaces (10, 12) positioned under an outlet opening (8) of said introducing means (3), for providing the free flowing of said disaggregated solid materials; and means for conducting said disaggregated solid materials away from said inclined surfaces, said last-named means comprising a plurality of concentric closed lines of fixedly positioned downwardly inclined tubes (13) under the region where said inclined surfaces are located, said tubes being provided with a symmetric arrangement of their lower extremities (13a) in the region where said tubes open to the interior of the associated vessel (15);

said inclined surfaces (10, 12) and said descending tubes (13) being constructed and arranged such that, during the loading operation, said disaggregated solid materials form a continuous bed from the location (19) where they fall from said introducing means (3) to the location where they leave the open ends of said descending tubes (13) and accumulate in the interior of the associated vessel (15).

2. Mechanism for granulometric distribution of solid particles according to claim 1, characterized in that the means to provide the free flow of said disaggregated solid materials in the interior of the mechanism are formed by a pyramidal surface (10) enveloped by a surface (12) having the form of a frustum of a pyramid.

3. Mechanism for granulometric distribution of solid particles according to claiim 1, characterized in that the means to provide the free flow of said disaggregated solid materials in the interior of the mechanism are formed by a conical surface (10) enveloped by a surface (12) having the form of a frustum of a cone.

4. Mechanism for granulometric distribution of solid particles according to claim 1, wherein:

said means to introduce solid disaggregated materials into the mechanism is a funnel-shaped hopper (3), a rotatable vertical shaft (6) is provided to support said funnel-shaped hopper for rotation about a vertical axis, said funnel-shaped hopper is provided with an uppper opening through which the disaggregated solid materials enter the hopper from the outside, and said outlet opening (8) through which said disaggresgated solid materials are discharged from said funnel-shaped hopper (3) is located eccentrically of the latter, whereby said outlet opening moves along a circumferential path about the axis of said rotatable vertical shaft (6);

said means to provide the flow of the disaggregated solid materials are constituted by a conical surface (10) enveloped by a frusto-conical surface (12) which is, in turn, surrounded by a portion of the external wall (9) of the mechanism so that the spaces (16, 17) defined by said conical surfaces and said wall portion form paths of flow for the disaggregated solid materials, said flow providing being means situated under said outlet opening (8) of the funnel-shaped hopper (3) in such a manner that said outlet opening (8) is not reached by the upper level of the bed of disaggregated solid materials in the mechanism when the latter is in normal operation; and said concentric lines of tubes (13) which constitute the means for conducting the disaggregated solid materials away from said flow providing means are positioned under the lower parts of the respective spaces (16, 17) defined by the concentric conical surfaces of the flow providing means, and said tubes (13) are open at their lower extremeties to the interior of the vessel (15) into which the disaggregated solid materials are being charged.

5. Mechanism for granulometric distribution of solid particles according to claim 4, wherein a sensitive system (CN) is provided to interrupt the functioning of the outside equipment which conveys the disaggregated solid materials to the interior of said funnel-shaped hopper (13) and interrupts the rotating movement of the latter when the upper level of said disaggregated solid materials in the interior of the mechanism rises above a given limit below said outlet opening (8) of the funnel-shaped hopper (3), said sensitive system (CN) being operable to resume said interrupted functioning when the upper level of the disaggregated solid materials falls beyond a certain limit below the upper limit in which said functioning was interrupted.

6. Mechanism for granulometric distribution of solid particles according to claim 4, wherin said outlet opening (8) of the funnel-shaped hopper (3) is positioned to move revolvingly along a circumference situated midway between the outer wall (1a) of said mechanism in the upper zone thereof and the central axis (18) of the upper portion of the load of disaggregated solid materials in the interior of the mechanism when said mechanism is in operation, in a manner that the disaggregated solid materials fall in the space (19) within said upper zone to form a double-funneled surace having an upper level about midway between said central axis (18) and said outer wall (1a), and a pair of lower levels one at said axis (18) and the other at said outer wall (1a), and the upper part of the frusto-conical surface (12) of the flow providing means has an upwardly directed rim (11) located below and aligned with said circumference and constituting a static flow divider, whereby the solid particles are substantially homogeneously distributed without segregation in the interior of the vessel (15).

7. Mechanism for granulometric distribution of solid particles according to claim 4, wherein said outlet opening (8) of the funnel-shaped hopper (3) is positioned to move along a circumference which is closely adjacent to the outer wall (1a) of said mechanism in the upper zone thereof, in a manner that the disaggregated solid materials fall in the space (19) within said upper zone to form a funneled surface the lower level of which is located close to the central axis (18) of the upper portion of the load of disaggregated solid materials in the interior of the mechanism and the upper level is located close to the outer wall (1a) of said mechanism, the arrangement being such that the solid particles of greater size according to granulometric distribution accumulate close to the axis (18) in the central zone of the upper portion of the load of disaggregated solid materials in the interior of the mechanism and the solid particles of smaller size accumulate close to the outer wall (1a) of said mechanism, and the upper part of the frusto-conicakl surface (12) of the flow providing means has an upwardly directed rim (11) located below and aligned with said circumference and constituting a static flow divider, whereby the greater size particles accumulate in the central zone of the vessel (15) and the smaller size particles accumulate in the peripheral zone of said vessel.

8. Mechanism for granulometric distribution of solid particles according to claim 4, wherein said outlet opening (8) of the funnel-shaped hopper (3) is positioned to move along a circumference which is closely adjacent to the central axis (18) of the upper portion of the load of disaggregated solid materials in the upper zone of said mechanism, in a manner that the disaggregated solid materials fall in the space (19) within said upper zone to form a funneled surface the upper level of which is. located close to the central axis (18) of the upper portion of the load of disaggregated solid materials in the interior of the mechanism and the lower level is located close to the outer wall (1a) of said mechanism, the arrangement being such that the solid particles of smaller size according to granulometric distribution accumulate close to the axis (18) in the central zone of the upper portion of the load of disaggregated solid materials in the interior of the mechanism and the sold particles of greater size accumulate close to the outer wall (1a) of said mechanism, and the upper part of the frusto-conical surface (12) of the flow providing means has an upwardly directed rim (11) located below and aligned with said circumference and constituting a static flow divider, whereby the smaller size particles accumulate in the central zone of the vessel (15) and the greater size particles accumulate in the peripheral zone of said vessel.

9. Mechanism for graulometric distribution of solid particles according to any of claims 1 to 8, characterized in that the disaggregated solid materials are particles of bitumnous shale and the vessel (15) is a pyrolysis vertical retort in whose interior said shale particles flow downwardly fomring a moving bed which is heated by contact in counter-current with hot upwardly flowing gases.

10. Mechanism for granulometric distribution of solid particles according to any of claim 1 to 8, characterized in that said vessel (15) is a blast furnace employed for the reduction of ores to metals by reaction with coke.

11. Mechanism for granulometric distribution of solid particles which is specially designed to provide the loading of such solid particles into large dimension vessels starting from equipment of small dimensions in relation to said vessels; the mechanism being characterized in that:

- means (3) having an outlet opening (8) operable to be variably positioned relative to said mechanism for corresponding introducing disaggregated solid particles into said mechanism;
- means, constituted of a plurality of inclined concentric surfaces (10, 12) positioned under said outlet opening (8) of said introducing means (3), for providing for a free flowiing of said disaggregted solid particles along a plurality of generally downwardly directed paths from the region location; and
- means comprising a plurality of concentric closed lines of fixedly positioned downwardly inclined tubes (13) positioned under the region where said inclined surfaces are located, for conducting said disaggreated solid particles away from said lower location, with reach of said lines of tubes communicating with a respective one of the flow paths defined by said inclined surfaces, and said tubes being provided with a symmetric arrangement of their lower extremities (13a) in the region where said tubes open to the interior of the associated vessel (15);
- said inclined surfaces (10, 12) and said descending tubes (13) being constructed and arranged such that, during the loading operation, said disaggregated solid particles form a continuous bed from the location (19) where they fall from said introducing means (3) to the location where they leave said descending tubes (13) and accumulate in the interior of the associated vessel (15).

* * * * *

UNITED STATES PATENT OFFICE
CERTIFICATE OF CORRECTION

PATENT NO. : 4,399,846

DATED : Aug. 23, 1983

INVENTOR(S) : De Souza Dias et al.

Page 1 of 2

It is certified that error appears in the above-identified patent and that said Letters Patent are hereby corrected as shown below:

Col. 3, line 41: change "extremeties" to --extremities--.
       line 46: change "downwad" to --downward--.
       line 57: change "diametere" to --diameters--.

Col. 4, line 31: change "conceived.dr" to --conceived.--.

Col. 5, line 36: change "loer" to --lower--.
       line 66: change "cyclinder" to --cylinder--.

Col. 10, line 67: change "examle" to --example--.

Claim 3, col. 12, line 28: change "claiim" to --claim--.

Claim 4, col. 12, lines 55-56: change "being means" to --means being--.

Claim 5, col. 13, line 7: change "(13 )" to --$\underline{3}$--.

Claim 6, col. 13, line 18: change "wherin" to --wherein--.
       col. 13, line 26: change "surace" to --surface--.

Claim 7, col. 13, line 54: change "conicakl" to --conical--.

Claim 8, col. 14, line 10: change "sold" to --solid--.

Claim 9, col. 14, line 20: change "graulometric" to --granulometric--.
       col. 14, line 23: change "bitumnous" to --bituminous--.
       col. 14, line 25: change "fomring" to --forming--.

Claim 10, col. 14, line 29: change "claim" to --claims--.

UNITED STATES PATENT AND TRADEMARK OFFICE
CERTIFICATE OF CORRECTION

PATENT NO. : 4,399,846                               Page 2 of 2

DATED : Aug. 23, 1983

INVENTOR(S) : De Souza Dias et al.

It is certified that error appears in the above–identified patent and that said Letters Patent are hereby corrected as shown below:

Claim 11, col. 14, line 40: change "corresponding" to --correspondingly--.
col. 14, line 45: change "flowiing" to --flowing--.
col. 14, line 45: change "disaggregted" to --disaggregated--.
col. 14, line 47: change "region location" to --region of their introduction into said mechanism to a lower location--.
col. 14, line 53: change "disaggreated" to --disaggregated--.
col. 14, line 54: change "reach" to --each--.

Signed and Sealed this

Fourteenth Day of August 1984

[SEAL]

Attest:

GERALD J. MOSSINGHOFF

Attesting Officer          Commissioner of Patents and Trademarks